Jan. 4, 1966 W. C. WHITTUM 3,227,499
ROLL SUPPORT
Filed March 7, 1962 2 Sheets-Sheet 1
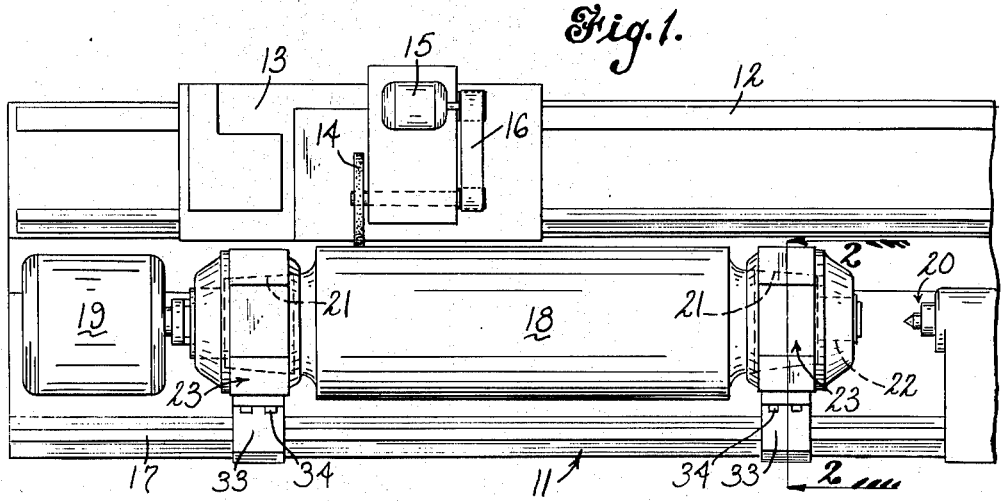
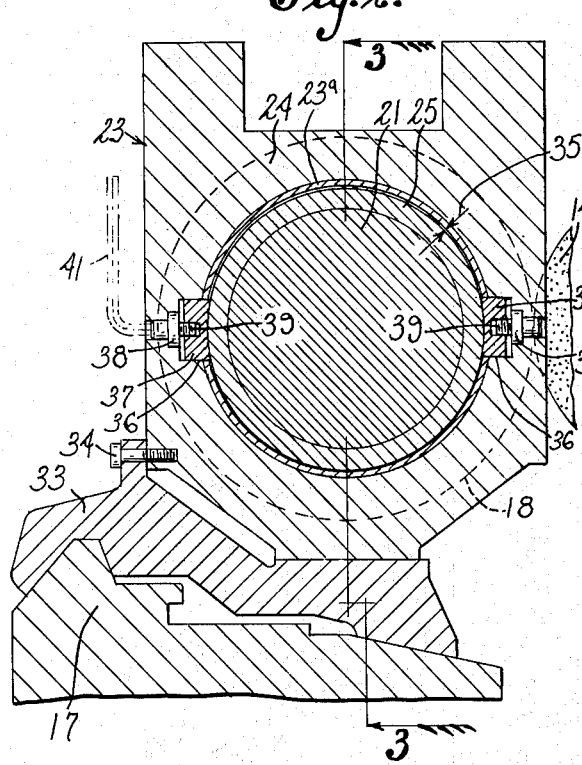
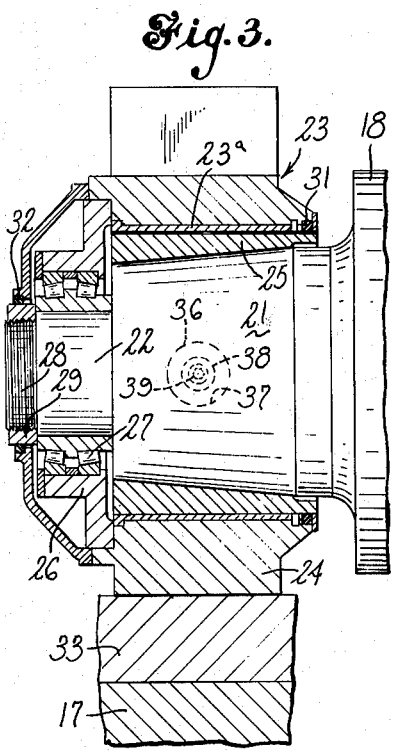
INVENTOR
Warren C. Whittum
BY
Spencer, Rockwell & Bartholow
ATTORNEYS Jan. 4, 1966 W. C. WHITTUM 3,227,499
ROLL SUPPORT
Filed March 7, 1962 2 Sheets-Sheet 2
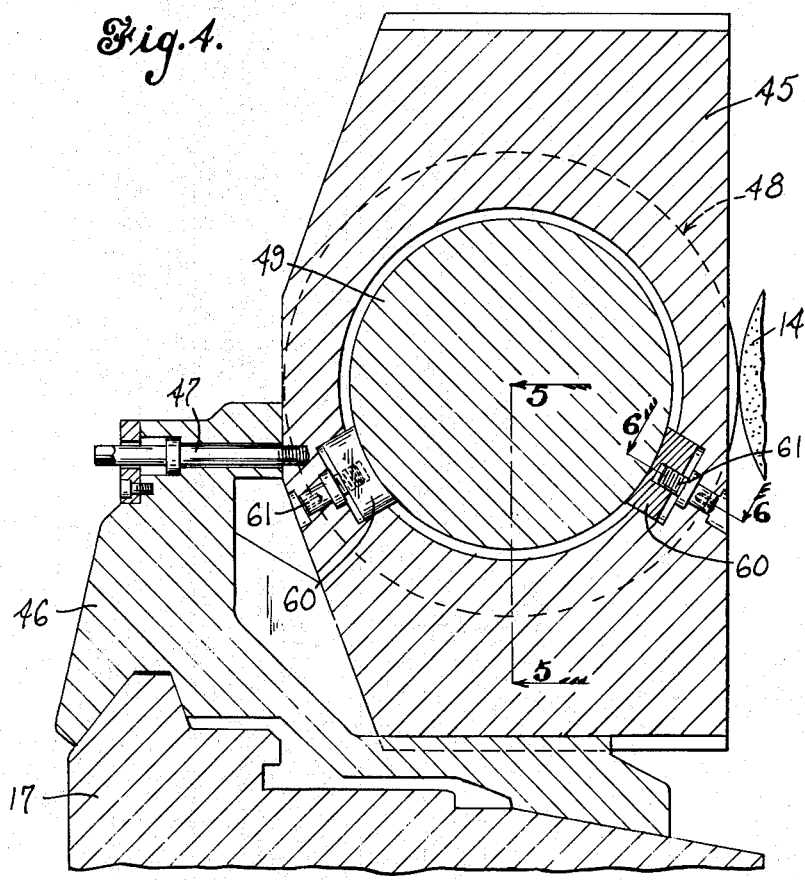
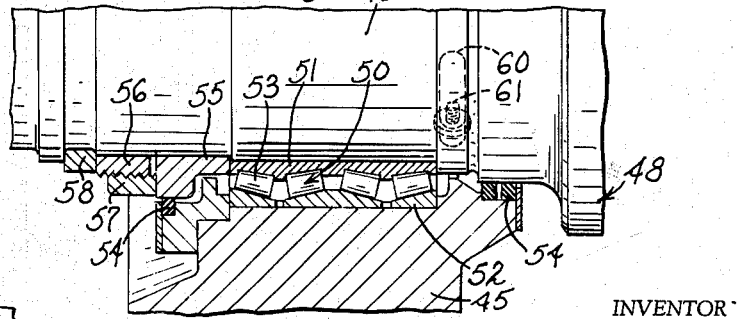
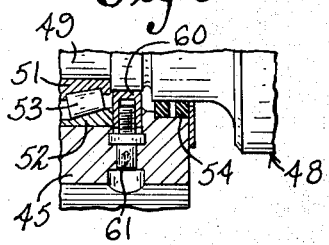
INVENTOR
Warren C. Whittum
BY
Spencer, Rockwell & Bartholow
ATTORNEYS United States Patent Office 3,227,499
Patented Jan. 4, 1966

3,227,499
ROLL SUPPORT
Warren C. Whittum, Orange, Conn., assignor to Farrel Corporation, a corporation of Connecticut
Filed Mar. 7, 1962, Ser. No. 178,006
3 Claims. (Cl. 308—35)

This invention relates generally to an apparatus for journalling mill rolls. More particularly, the invention relates to an apparatus for supporting the journals of mill rolls for mounting in steel mills, paper mills and the like which can be used for supporting the mill rolls during roll grinding.

Rolls which are used in steel mills, paper mills and other types of mills become worn and marked through use. When a roll is so worn and marked that it can no longer be used in production, it is standard procedure to transfer the roll to a roll grinder where it may be resurfaced. In the mill, each roll is normally supported by means of its journals which are mounted in bearings in roll journal boxes. Since the bore of the journal box bearing may vary from .010" to .050" larger in diameter than the roll journal in order to provide clearance for hydraulic dynamic lubrication, it has not heretofore been feasible to regrind the rolls while they are supported in conventional journal boxes. Resurfacing would be unsatisfactory since the bearing clearances would permit a sufficient amount of play or lateral movement of the roll to prevent regrinding within dimensional tolerances. This holds true even where the journals are supported in roller bearings since clearance is provided between the inner and outer races. Thus, it has been standard procedure to dismount the roll from its journal boxes and support it on special supports in the roll grinder which support the roll free from lateral play. However, dismounting the roll from its journal boxes is a time-consuming and costly operation, making it desirable to provide a journal box having the required bearing clearance for lubrication when the roll is mounted in the mill and which also provides for properly supporting the mill roll in a roll grinder without necessitating removal of the journal box.

Accordingly, it is an object of this invention to provide an apparatus for supporting a mill roll in a mill, which may also be used for supporting the roll in a roll grinder.

Another object of the invention is to provide an apparatus for supporting a mill roll in a mill which has the required clearance between the journal and a bearing element for proper lubrication and which may also be used for supporting the roll during regrinding.

A further object of this invention is to provide an apparatus for supporting a mill roll which provides clearance between the bearing element and the journal of the roll for lubrication and which secures the roll against lateral movement during regrinding.

Still other objects and advantages of the invention will in part be obvious and will in part be apparent from the following specification.

Generally speaking, in accordance with the invention, an apparatus is provided for supporting a journal of a mill roll in a journal box carrying a bearing assembly in which the journal is disposed. Clearance is provided between a bearing element and the journal to permit lubrication. Adjustable journal supports are provided in the journal box to stabilize the roll and prevent lateral movement of the journal in the journal box when the roll, with the journal boxes attached, is transferred to a roll grinder for resurfacing of the roll.

The invention accordingly comprises the features of construction, combination of elements and arrangement of parts which are hereinafter set forth in detail, and the scope of the invention will be apparent from the claims.

For a fuller understanding of the invention, reference is had to the following description taken in connection with the accompanying drawings in which:

FIG. 1 is a top plan view of a roll grinder having the roll to be reground mounted thereon, the roll being supported in accordance with the invention;

FIG. 2 is an enlarged sectional view taken along line 2—2 of FIG. 1, showing one of the two mountings of the roll journals;

FIG. 3 is a sectional view taken along line 3—3 of FIG. 2;

FIG. 4 is a view similar to FIG. 2 but illustrating a modified form;

FIG. 5 is a sectional view taken on line 5—5 of FIG. 4; and

FIG. 6 is a sectional view taken on line 6—6 of FIG. 4.

Referring now to FIG. 1, a roll grinder 11 is provided with a set of ways 12 on which is positioned a carriage 13 adapted to traverse the ways in any well known manner. A grinding wheel 14 is suitably mounted on carriage 13 and is adapted to be driven by a motor 15 through means such as belt 16.

A bed 17 is provided parallel to ways 12 for mounting of a roll 18 thereon. A motor 19 is mounted on bed 17 for rotating roll 18 which is to be reground. A center 20 may be provided on bed 17 for aligning the roll.

Referring to FIG. 3, roll 18 is provided with a tapered journal portion 21 and a cylindrical journal portion 22 at each end of the roll, one end only being shown. The journal at each end of the roll is supported in a journal box 23. The journal box comprises a frame member 24 having an opening therethrough in which is mounted a bearing element or liner 23a adapted to engage and support tapered sleeve 25 on the journal, which for the purpose of this description should be considered an integral part of the journal. An additional frame member 26 is suitably secured to frame member 24, the additional frame member carrying a roller bearing assembly 27 which engages and supports the journal portion 22. Each end of roll 18 is provided with a threaded portion 28 which is engaged by nut 29 to secure the journal in the journal box. Two seals 31 and 32 are provided exteriorly of each journal to effect an oil seal between the journal and the journal box so that the journals may be lubricated hydrodynamically.

When the roll is in operational position in a steel mill, paper mill or the like, it is mounted in the mill by means of the journal boxes 23 at the respective ends of the roll, the mill being provided with conventional supports for the journal boxes. When it is desired to regrind the roll surface, the roll is removed from the mill with the journal boxes attached and each journal box is mounted on a support member 33, as shown in FIG. 2. Support member 33 is supported on bed 17 and may be positioned at any point therealong. Due to the large mass of the roll it is only necessary that the journal boxes rest on support member 33 and proper positioning may be effected by screw 34 secured in frame member 24 through support member 33.

The engagement of grinding wheel 14 with the surface of roll 18 is also shown in FIG. 2. The mill clearance between journal portion 25 and bearing element 23a is indicated at 35 in FIG. 2. It is easily seen that pressure of grinding wheel 14 against the surface of roll 18 could cause lateral displacement of the roll with respect to the journal boxes. To overcome this, frame member 24 is provided with a pair of substantially opposite circular recesses 36 aligned with similar recesses in element 23a and in which are mounted journal supports 37. A screw 39 is mounted in the frame member adjacent each journal support through an integral radial flange 38 recessed in the frame member 24. The threaded portion of the screw 39 threadedly engages the corresponding support 37, thereby providing means for adjusting the position of the support 37 inwardly and outwardly of the recess 36. The support has a journal-engaging face which is contoured to correspond to the contour of the roll journal, and this prevents the support 37 from rotating in the recess 36. Screw 39 is accessible from without the frame member 24 and may be rotated by any suitable means such as a wrench 41. When the roll is mounted in a mill, the journal supports will be moved to the outermost or retracted position out of contact with the roll journal, by means of the adjusting screws. When the roll is mounted in the roll grinder for resurfacing, the screws will be adjusted to cause the journal supports to engage and hold the journals thereby preventing lateral movement of the journals in their bearings without impairing the rotation of the roll. As motor 19 rotates roll 18, grinding wheel 14 is rotated in contact with the surface of the roll while, in the present instance, traversing the roll to effect resurfacing of the roll. It will be understood that if desired, the roll may be reground in a machine in which the roll is reciprocated axially instead of the grinding wheel. Thus, rolls may be resurfaced without the necessity of removing their journal boxes and without loss of accuracy in the resurfacing operation.

The invention also contemplates the use of additional journal supports, if required, or varying the placement of the supports around the journal to eliminate lateral play in the journal mountings during the regrinding operation. Journal supports can be used equally as well with roller bearings.

In the form of FIGS. 4–6 there is provided a frame member 45 similar to the frame member 24 previously described. The frame member 45, when supported on a grinding machine, may rest on a support 46 similar to the support 33 previously described. A bolt 47 may be provided to position the frame member 45 on the support 46. In the illustrated form, the support 46 rests on the bed 17 of the grinding machine. The roll is indicated generally at 48 and it will be understood, of course, that the two ends of the roll are supported in like manner, only one support being shown. It will be further understood that the support 46 may be adjusted along the bed 17 of the grinding machine in accordance with the length of the roll.

The journal box which supports one end of the roll in a mill includes the frame member 45 which receives the roll neck or journal 49. Between the roll neck 49 and the frame member 45 there is provided an anti-friction roller assembly, indicated generally at 50, having an inner race 51 which is, in effect, and for purposes of this description integral with the roll neck or journal. The outer race is indicated at 52 and, as shown in FIG. 5, anti-friction rollers 53 are interposed between the inner and outer races.

The bearing for the roll journal is lubricated as in the form previously described and oil seals 54 are provided. A retainer element 55 of annular form is provided for the anti-friction roller assembly and is axially positioned on the roll neck by threaded members 56 and 57 cooperating with one another and in turn retained on the roll neck by an annular element 58.

The journal box includes a pair of journal supports 60, similar to the journal supports 37 previously described, which supports are operative, when a roll supported from the journal box is being reground, to support the roll journal against lateral play so that the roll may be reground with great precision which would not be possible if the journal was supported only in its bearing. The journal supports 60 permit rotation of the roll 48 during grinding. It will be understood, of course, that the supports 60 are retracted when the roll is mounted in a mill in its journal boxes.

The journal supports 60 are approximately oppositely disposed and are of oblong form as shown in FIG. 5 and 6. In this form of the roll support, the supports 60 do not operate through a bearing element as in the form of FIGS. 1–3 but are located at one end of the anti-friction bearing assembly. The journal supports 60 are mounted in suitable openings in the frame member 45 and may be extended and retracted by screws 61 similar to the screws 39 previously described. The journal supports 60 have faces contoured to mate with the roll journal.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

What is claimed is:

1. A journal box for supporting a roll journal in a mill and alternatively in a grinding machine for the purpose of redressing the roll face, the journal box comprising in combination a frame, a bearing mounted in said frame, said bearing being adapted to support a roll journal during rotation thereof in a mill, support means comprising at least one support element slidably mounted in the frame adjacent said bearing for movement radially of a roll journal when a roll is in a grinding machine, a screw threadedly engaging said support element and cooperating with the frame tending to prevent movement of a roll journal in the bearing in a plane normal to a roll axis during the grinding of a roll, said bearing is a roller bearing and said support means is in a location axially removed from said roller bearing.

2. A journal box for supporting a roll journal comprising in combination, a frame, a bearing mounted in said frame and positioned to support a roll journal during rotation thereof and at least one roll journal support means slidably mounted in said frame and movable toward the axis of a roll journal positioned within said frame, said bearing comprising a roller bearing and said roll journal support means is in a location axially removed from said roller bearings.

3. In combination, a frame, a roll journal mounted in said frame, a bearing mounted in said frame and positioned to support said roll journal during rotation thereof in said frame, and at least one roll journal support means slidably mounted in said frame and movable toward the axis of said roll journal positioned within said frame, said bearing comprising a rollar bearing and said roll journal support means is in a location axially removed from said roller bearings.

References Cited by the Examiner
UNITED STATES PATENTS

| | | | |
|---|---|---|---|
| 213,310 | 3/1879 | Yeo | 308—32 X |
| 1,619,995 | 3/1927 | Turner et al. | 308—35 |
| 1,778,452 | 10/1930 | Ernst | 308—65 X |
| 2,230,899 | 2/1941 | McGrath | 308—32 X |
| 2,450,734 | 10/1948 | Majeski | 308—65 X |
| 2,936,197 | 5/1960 | Weiler | 308—73 |
| 3,053,587 | 9/1962 | Wallgren | 308—73 |

DON A. WAITE, *Primary Examiner.*

MILTON KAUFMAN, FRANK SUSKO, *Examiners.*